United States Patent [19]

Grimm

[11] Patent Number: 5,004,073

[45] Date of Patent: Apr. 2, 1991

[54] AUTOMATIC LUBRICATION DEVICE FOR MECHANICAL ACTUATION SYSTEMS

[75] Inventor: Duane H. Grimm, Rockford, Ill.

[73] Assignee: Sundstrand Corporation, Rockford, Ill.

[21] Appl. No.: 440,074

[22] Filed: Nov. 22, 1989

[51] Int. Cl.$^5$ .............................................. F01M 9/10
[52] U.S. Cl. ........................... 184/6.12; 184/32; 74/467; 475/159; 464/7
[58] Field of Search ............. 184/6.12, 6.17, 7.4, 184/32, 37; 74/467; 475/159; 464/7

[56] References Cited

U.S. PATENT DOCUMENTS

| | | | |
|---|---|---|---|
| 1,737,570 | 12/1929 | Collins | 184/37 |
| 3,162,872 | 12/1964 | Adelman. | |
| 4,000,664 | 1/1977 | Christensen. | |
| 4,526,054 | 7/1985 | Ehrlinger | 74/467 |

*Primary Examiner*—Stephen F. Husar
*Assistant Examiner*—Alan B. Cariaso
*Attorney, Agent, or Firm*—Wood, Phillips, Mason Recktenwadl & Vansanten

[57] ABSTRACT

Periodic lubrication of mechanical actuation systems may be avoided in a self-lubricating mechanism for such a system that includes a bidirectional rotary shaft (22), a housing (10), and a one-way clutch (90, 92) having an output element (92) moved in response to one direction of rotation of the shaft (22) and which may remain stationary for the opposite direction of rotation of the shaft (22). Included is a variable volume lubricant reservoir (40, 58) within the housing (10) and a gear system (44, 80, 94, 96, 98) interconnects the output element (92) and the reservoir (40, 58) to continuously feed lubricant therefrom whenever the shaft (22) is rotated in one direction.

11 Claims, 1 Drawing Sheet

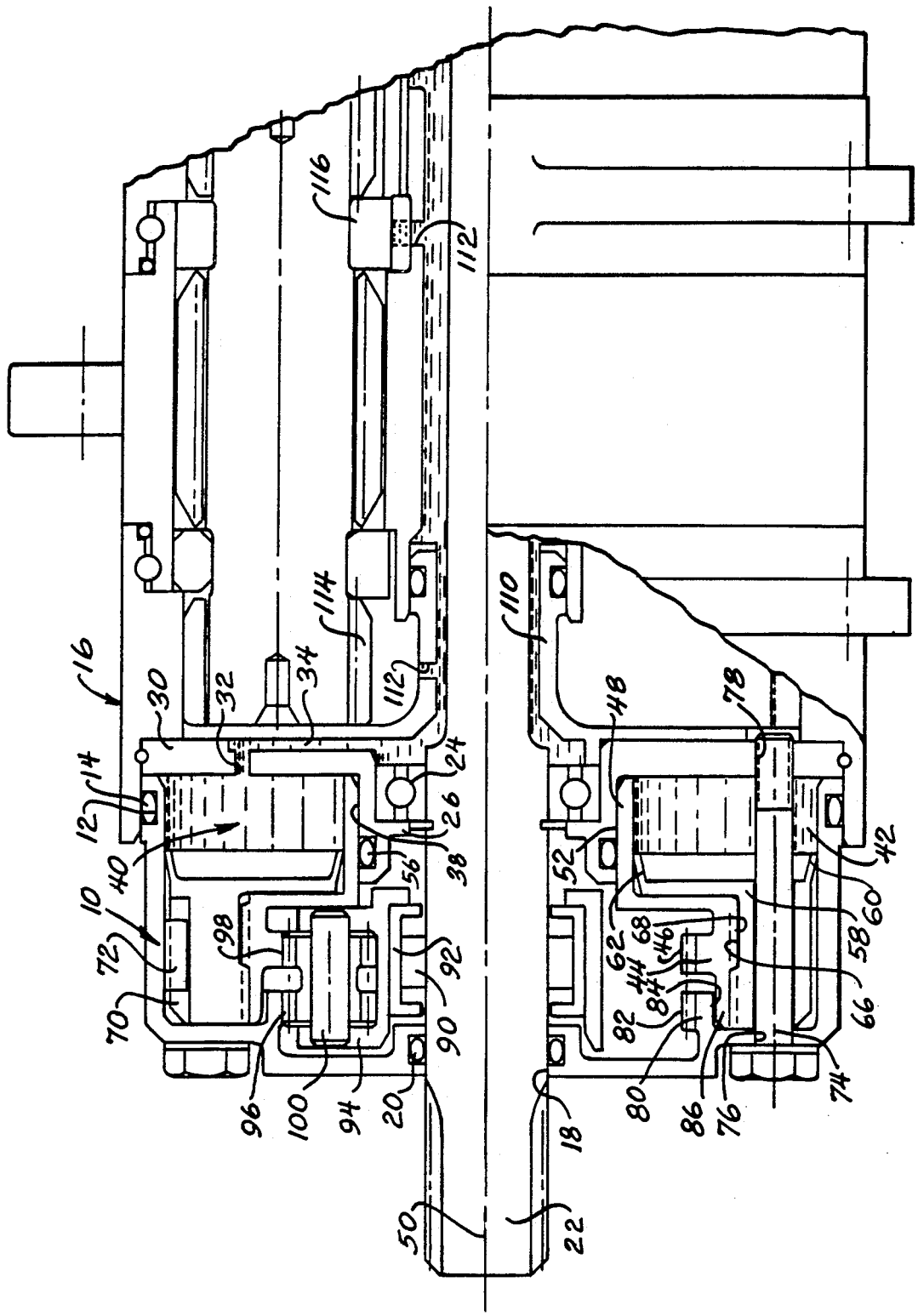

AUTOMATIC LUBRICATION DEVICE FOR MECHANICAL ACTUATION SYSTEMS

FIELD OF THE INVENTION

This invention relates to a self lubrication mechanism that may be utilized in a mechanical actuation system to provide lubrication for the same in an automatic fashion.

BACKGROUND OF THE INVENTION

Many types of mechanical actuation systems require periodic lubrication. In the usual case, such periodic lubrication has been accomplished at regular maintenance intervals by applying grease under pressure through conventional grease zerks.

Unfortunately, in many instances, the placement of the zerks does not always assure proper distribution of the lubricant. Moreover, overfilling has occasionally caused problems.

Furthermore, the entire system is totally dependant upon someone performing the periodic lubrication procedure. Not only does this introduce a human element into the procedure, it also tends to add expense because of the bookkeeping and labor involved. While at first blush, bookkeeping expense would appear to be minimal or almost nonexistent, in the case of the maintenance of mechanical actuation systems employed in aircrafts, or for that matter most anything employed in the maintenance of aircraft, bookkeeping requirements may be substantial.

The present invention is directed to overcoming one or more of the above problems.

SUMMARY OF THE INVENTION

It is the principal object of the invention to provide a new and improved self-lubrication mechanism for mechanical actuation systems. More particularly, it is an object of the invention to provide such a mechanism for a system that includes a bidirectional rotary input as, for example, a mechanical actuation system utilized in controlling the control surfaces of an aircraft.

An exemplary embodiment of the invention achieves the foregoing objects in a structure that includes a housing, a shaft journaled within the housing for bidirectional rotary motion, a one-way clutch connected to the shaft and having an output element that is moved in response to one direction of rotation of the shaft and which may remain stationary for the opposite direction of rotation of the shaft and a variable volume lubricant reservoir within the housing. Means are provided which are responsive to the output element for progressively reducing the volume of the reservoir. Thus, by reducing the volume of the reservoir, lubricant therein may be forced therefrom to points of use and such lubricant flow will occur effectively continuously during a use of the system. Thus, the human element involved in periodic maintenance and the record keeping involved in documenting periodic maintenance may be avoided.

In a preferred embodiment of the invention, the output element of the clutch is a rotary element and a reduction gear means interconnects the rotary element and the responsive means.

In one embodiment of the invention, the system includes a pair of coupled planet gears in the housing which are rotatable in response to rotation of the clutch output element. A fixed ring gear is meshed with one of the planet gears to form a first gear set while a rotatable ring gear is meshed with the other of the planet gears to form a second gear set. The ratios of the two gear sets are chosen to be very close but not equal. The means utilized to decrease the volume of the reservoir are responsive to movement of the rotatable ring gear.

As a consequence of such a configuration, and the choosing the gear ratios to be very close but not equal, notwithstanding high speeds of the shaft, the ring gear will rotate at an extremely slow speed to slowly meter lubricant from the reservoir to the system components.

The invention contemplates that the planet gears be mounted on a carrier which in turn is coupled to the clutch output.

In a preferred embodiment, the reservoir is defined by a cylinder and a piston is reciprocally received therein. The volume decreasing means utilized to decrease the reservoir volume comprises a rotary to reciprocating motion converting mechanism interconnecting the rotatable ring gear and the piston.

Preferably, the motion converting mechanism comprised meshing threaded surfaces on the piston and on the rotatable ring gear.

In a highly preferred embodiment, the various components are all concentric about the shaft and the cylinder is an annular cylinder as is the piston.

In this embodiment of the invention, the annular cylinder will include a radially innerannular wall with a radially outward facing annular surface. The rotatable ring gear is provided with a sleeve-like end with an internal surface in substantial abutment with the radially outward facing annular surface so that the latter journals the ring gear for rotation within the housing.

Other objects and advantages will become apparent from following specification taken in connection with the accompanying drawings.

DESCRIPTION OF THE DRAWINGS

The FIGURE is a sectional view of a self-lubricating mechanism made according to the invention.

DESCRIPTION OF THE PREFERRED EMBODIMENT

An exemplary embodiment of a self-lubricating mechanism made according to the invention is illustrated in the drawing and with reference thereto is seen to include a cup shaped housing, generally designated 10, having a peripheral groove 12 for receipt of an O-ring seal 14 by which it may be sealed to a system such as a flap actuating system, generally designated 16, with which the self-lubricating system is to be used.

The housing 10 includes a central opening 18 also provided with an O-ring seal 20 through which an actuating shaft 22 extends. The shaft 22 is journaled as by bearings 24 within the housing for bidirectional rotary movement. The bearings 24 may be fitted against a flange 26 that is inwardly directed and constitutes part of a closure cap 30 for the housing 10. The closure cap 30 also is provided with a lubricant outlet port 32 along with a connected radially directed channel 34 whereby lubricant may be directed to the exterior 36 of the shaft 22 in the vicinity of the bearings 24.

The cap 30 also includes a radially outwardly facing annular wall 38 which forms the inner wall of an annular cylinder, generally designated 40, which serves as a grease reservoir.

The radially outer wall of the annular cylinder 40 is formed by a part 42 of the housing 10.

Within the housing 10 is a rotatable ring gear 44 having inwardly facing gear teeth 46. As seen in the FIGURE, the right-hand end of the ring gear 44 terminates in an axially directed sleeve 48 which is concentric with the rotational axis 50 of the shaft 22. The sleeve 48 has an inner surface 52 which is in substantial abutment with the surface 38 such that the latter serves to journal the ring gear 46 within the housing 10.

A seal 56 is located at the interface of the sleeve 48 and the surface 36 to prevent lubricant contained within the cylinder 40 from escaping through this interface.

An annular piston 58 is disposed within the cylinder 40 and has an external skirt 60 in sliding engagement with the outer cylinder wall 42 and an inner skirt 62 in slidable engagement with the exterior surface of the sleeves 48.

The annular piston 58 also includes an annular, interiorly threaded surface 66 is threaded to an exteriorly threaded surface 68 on the exterior of the rotatable ring gear 44. As a consequence, a rotary to reciprocating motion mechanism is formed such that rotation of the ring gear 44 will result in reciprocation or axial movement of the piston 58 within the cylinder 40. As will be seen, movement of the piston 58 will be unidirectional only and will cause expulsion of the lubricant within the cylinder 40 through the port 32 and the passage 34.

In order to prevent rotation of the piston 58 with the ring gear 44, the piston 58, at a location remote from the cylinder 40, is provided with axial groove 70 in its outer surface. A key 72 forming part of the housing 10 is received within the groove 70 and thus restrains the piston 58 against rotational movement.

Bolts 74, at appropriate circumferentially spaced locations, extend through openings 76 in the housing 10 and threaded bores 78 in the cap 30 to hold the components in assembled relationship.

The housing 10 also mounts an internal, fixed ring gear 80 which is integral with the housing 10 itself and is concentric with the axis 50. The ring gear 80 includes inwardly facing teeth 82 and a radially outer surface 84 engages a sleeve-like projection 86 on the movable ring gear 44 to assist in journaling the latter.

Concentric with the axis 50 and within the housing 10 is a one-way or sprag clutch 90. The sprag clutch 90 is mounted to the shaft 22 and includes a rotary output element 92 which is also concentric with the shaft 22. As is well known, clutches such as the clutch 90 are operative to drive their output elements 92 in response to one direction of rotary movement of the input shaft 22 but not the other. That is to say, the one-way clutch 90 couples the output element 92 to the shaft 22 for but a single direction of rotation of the latter.

Contained within the housing 10 and coupled to the output element 92 for rotation therewith is a planetary gear carrier 94 that is rotatable about the axis 50. The planetary gear carrier 94 will thus rotate within the housing 10 for one direction of rotation of the shaft 22 but not the other.

Mounted on the carrier 94 is at least one set of planet gears 96 and 98 which are coupled to one another. That is to say, the gears 96 and 98 are not rotatable relative to each other but are journaled by a shaft 100 on the carrier 94 for rotation about an axis that is parallel to the axis 50. Thus rotation of the carrier within the housing 10 will revolve the gears 96 and 98 about the axis 50 of the shaft 22.

The gear 96 is meshed with the fixed ring gear 80 to form a first gear set. Similarly, the planet gear 98 is meshed with the rotatable ring gear 44 to form a second gear set. The gear sets are configured so that they have very close, but not identical gear ratios. As a consequence, during operation of the planetary gear mechanism, the rotational rates of the ring gears 44 and 80 will be very nearly identical; and since the ring gear 80 is fixed and thus controls the rate of rotation of the rotatable ring gear 44 by reason of the ring gears 44 and 80 being coupled through the gears 96 and 98, the rotatable ring gear 44 will be almost stationary. Consequently, movement of the piston 58 will be very slow.

By appropriately selecting the direction of rotation for which the clutch 90 will couple the shaft 22 to the carrier 94 or by appropriately selecting right-hand or left hand threads at the threaded connection defined by the surfaces 66 and 68, the system is configured so that piston 58 will only advance into the cylinder 40 and cannot be retracted therefrom without disassembling the system. Thus, the piston 58 will never be backed away from a body of lubricant within the cylinder 40 such that every time the shaft 22 is rotated in the appropriate direction, there will be an immediate and instantaneous feeding of lubricant.

Typically in the use of the invention, one or more sleeve-like elements such as that shown at 110 will surround the shaft 22 in spaced relation with respect thereto. The space will be in fluid communication with the radial passage 34 and thus will be continuously supplied with lubrication from the reservoir.

In the usual case, one or more radial bores 112 will be disposed within the sleeve-like element 110 and will face elements to be lubricated such as a gear 114 or a support ring 116. Thus, lubricant may be conveyed along the length of the shaft 22 to the various points requiring it and since feeding is continuous, the human factor as well as record keeping associated therewith is eliminated. Moreover, the continuous feeding assures proper distribution of lubricant and by appropriately selecting the gear ratios involved, overfeeding may be readily avoided since the human element has been removed from the systems.

What is claimed:

1. A self lubrication mechanism having a bidirectional rotary input comprising;

a housing;

a rotary input shaft journaled for bidirectional rotation within and extending from said housing;

a one-way clutch within said housing and coupled to said shaft, said clutch having an output element that is rotated by said shaft for one direction of rotation of said shaft and which may remain stationary for the opposite direction of rotation of said shaft;

a pair of coupled planetary gears in said housing and rotatable in response to rotation of said clutch output;

a fixed ring gear meshed with one of said planet gears;

a rotatable ring gear meshed with the other of said planet gears and rotatable in response to rotation of said planet gears;

a variable volume, lubricant reservoir with in said housing and having an outlet from which lubricant may exit to be directed to a component to be lubricated; and means responsive to rotation of said rotatable ring gear for progressively decreasing the volume of said reservoir to thereby direct lubricant through said outlet.

2. The self lubricating mechanism of claim 1 wherein the pitch diameters of said fixed ring gear and said rotatable ring gear are close but not identical whereby said rotatable ring gear will rotate very slowly in response to rotation of said planetary gears.

3. The self lubricating mechanism of claim 1 wherein said planet gears are mounted on a carrier and said carrier is coupled to said clutch output.

4. The self lubricating mechanism of claim 1 herein said reservoir is defined by a cylinder and a piston reciprocally received therein and said volume decreasing means comprise a rotary to reciprocating motion converting mechanism.

5. The self lubricating mechanism of claim 4 wherein said rotary to reciprocating converting mechanism comprises meshing threaded surfaces on said piston and on said rotatable ring gear.

6. A self lubrication mechanism having a bidirectional input comprising:
 a housing;
 a shaft journaled in said housing for bidirectional rotary motion;
 an annular cylinder within said housing generally concentric with said shaft and adapted to receive a lubricant;
 an outlet port extending from said cylinder;
 an annular piston reciprocally received within said cylinder generally concentric with said shaft and operable to expel lubricant in said cylinder through said outlet port, said piston, oppositely of said cylinder, including an internally threaded surface concentric with said shaft;
 means interconnecting said housing and said piston for allowing axial movement of the piston while restraining rotational movement thereof;
 a one way clutch in said housing and having an output element rotatable with said shaft for one direction of shaft rotation and which may remain stationary for the opposite direction of shaft rotation, said output element being concentric with said shaft;
 a carrier in said housing concentric with said shaft and coupled to said output element;
 a fixed ring gear within said housing and concentric with said shaft;
 a rotatable ring gear within said housing concentric with said shaft and having an externally threaded surface concentric with said shaft and threaded said internally threaded in surface of said piston; and
 at least one set of coupled planet gears carried by said carrier for revolution about said shaft and journaled on said carrier for rotation relative thereto about an axis parallel to said shaft, one of said planet gears being meshed with said fixed ring gear to form a first gear set and the other of said planet gears being meshed with said rotatable ring gear to form a second gear set, the ratios of said first and second gear sets being close to each other but not identical.

7. The self lubricating mechanism of claim 6 wherein said annular cylinder includes a radial inner annular wall with a radially outward facing annular surface and said rotatable ring gear has a sleeve-like end with an inner surface in substantial abutment with said radially outward facing annular surface to be journaled for rotation thereby.

8. The self lubricating mechanism of claim 6 where said outlet port includes a channel that extends radially inward to the exterior of said shaft, at least one sleeve-like element surrounding said shaft in spaced relation thereto and having its interior in fluid communication with said outlet port and a radial bore in said sleeve-like element directed toward a component to be lubricated so that lubricant from said outlet port may flow along said shaft between said shaft and said sleeve-like element and to a component to be lubricated through said bore.

9. A self lubricating mechanism for a system including a rotary shaft and comprising;
 a housing;
 a shaft journaled with said housing for bidirectional rotary motion;
 a one way clutch connected to said shaft and having an output element that is moved in response to one direction of rotation of said shaft and which may remain stationary for the opposite direction of rotation of said shaft;
 a variable volume lubricant reservoir within said housing; and
 means responsive to movement of said output element for progressively reducing the volume of said reservoir.

10. The self lubricating mechanism of claim 9 wherein said output element is a rotary element.

11. The self lubricating mechanism of claim 10 further including reduction gear means interconnecting said rotary element and said responsive means.

* * * * *